US012204184B2

(12) United States Patent
Cao et al.

(10) Patent No.: US 12,204,184 B2
(45) Date of Patent: Jan. 21, 2025

(54) STRUCTURE FOR AN OPTOELECTRONICS PLATFORM AND METHOD OF FABRICATING A STRUCTURE FOR AN OPTOELECTRONICS PLATFORM

(71) Applicant: National University of Singapore, Singapore (SG)

(72) Inventors: Yu Cao, Singapore (SG); Shawn Yohanes Siew, Singapore (SG); Aaron James Danner, Singapore (SG); Thirumalai Venky Venkatesan, Singapore (SG)

(73) Assignee: National University of Singapore, Singapore (SG)

( * ) Notice: Subject to any disclaimer, the term of this patent is extended or adjusted under 35 U.S.C. 154(b) by 425 days.

(21) Appl. No.: 17/440,077

(22) PCT Filed: Mar. 26, 2020

(86) PCT No.: PCT/SG2020/050166
§ 371 (c)(1),
(2) Date: Sep. 16, 2021

(87) PCT Pub. No.: WO2020/197500
PCT Pub. Date: Oct. 1, 2020

(65) Prior Publication Data
US 2022/0365379 A1    Nov. 17, 2022

(30) Foreign Application Priority Data

Mar. 26, 2019  (SG) .......................... 10201902663T
Apr. 9, 2019    (SG) .......................... 10201903163Y

(51) Int. Cl.
*G02F 1/035* (2006.01)
*G02F 1/01* (2006.01)
(Continued)

(52) U.S. Cl.
CPC ............ *G02F 1/035* (2013.01); *G02F 1/0136* (2013.01); *G02F 1/05* (2013.01); *G02F 1/355* (2013.01); *G02F 1/212* (2021.01)

(58) Field of Classification Search
CPC .......... G02F 1/0136; G02F 1/035; G02F 1/05; G02F 1/212; G02F 1/355
See application file for complete search history.

(56) References Cited

U.S. PATENT DOCUMENTS 4,387,343 A    6/1983 Kondo
7,224,878 B1   5/2007 Wessels et al.
(Continued)

FOREIGN PATENT DOCUMENTS

CN    108519688 A    9/2018

OTHER PUBLICATIONS

Abel, et al., "A strong electro-optically active lead-free ferroelectric integrated on silicon," Nature Communications, published Apr. 9, 2013, (7 pages).
(Continued)

*Primary Examiner* — Daniel Petkovsek
(74) *Attorney, Agent, or Firm* — Volpe Koenig

(57) ABSTRACT

A structure for an optoelectronics platform and a method of fabricating a structure for an optoelectronics platform such as a Mach-Zehnder modulator or a waveguide. The method comprises the steps of providing a substrate, and depositing a BaTiO3, BTO, film on a surface of the substrate and having a thickness suitable for single mode operation with one or more possible polarization configurations with optical confinement in the BTO film at a wavelength or wavelength range of operation; wherein the substrate is chosen to provide vertical refractive index confinement in a direction perpendicular to the surface of the substrate for the single (Continued)

mode operation optical confinement in the BTO film at the wavelength or wavelength range of operation.

20 Claims, 16 Drawing Sheets

(51) Int. Cl.
   *G02F 1/05* (2006.01)
   *G02F 1/355* (2006.01)
   *G02F 1/21* (2006.01)

(56) References Cited

U.S. PATENT DOCUMENTS

| | | | |
|---|---|---|---|
| 2006/0091434 | A1 | 5/2006 | Eom et al. |
| 2007/0147725 | A1 | 6/2007 | Crespi et al. |
| 2011/0228375 | A1 | 9/2011 | Desai |
| 2018/0143465 | A1 | 5/2018 | Yoo et al. |
| 2020/0409190 | A1* | 12/2020 | Demkov ............... C23C 16/409 |
| 2022/0244583 | A1* | 8/2022 | Liang ..................... G02B 6/131 |

OTHER PUBLICATIONS

Abel, et al., "Large Pockels effect in micro- and nanostructured barium titanate integrated on silicon," Nature Materials, vol. 18, <https://doi.org/10.1038/s41563-018-0208-0> published Jan. 2019, (pp. 42-47).
Ahn, et al., "Ferroelectricity at the Nanoscale: Local Polarization in Oxide Thin Films and Heterostructures," American Association for the Advancement of Science, Science, vol. 303, No. 5657 ,dated Jan. 23, 2004, (pp. 488-491 with cover page).
Amanyan, et al., "The Synthesis and Structure of GdScO3," received Feb. 17, 1986, Russian Journal of Inorganic Chemistry, vol. 32, No. 9, published 1987, (pp. 1225-1228).
Barad, et al., "Domain rearrangement in ferroelectric Bi4Ti3O12 thin films studied by in situ optical second harmonic generation," Journal of Applied Physics, vol. 90, No. 7, published Oct. 1, 2001 (pp. 3497-3503 with cover page).
Barad, et al., "Erratum: "Probing domain microstructure in ferroelectric Bi4Ti3O12 thin films by optical second harmonic generation,"" Journal of Applied Physics, vol. 89, No. 9, published May 1, 2001, (p. 5230 with cover page).
Beach, et al., "Enhanced Curie Temperatures and Magnetoelastic Domains in Dy/Lu Superlattices and Films," Physical Review Letters vol. 70, No. 22, dated May 331, 1993 (pp. 3502-3505).
Beckers, et al., "Structural and optical characterization of epitaxial waveguiding BaTiO3 thin films on MgO," Journal of Applied Physics, vol. 83, No. 6, published Mar. 15, 1998, (pp. 3305-3310 with cover page).
Berlincourt, et al., "Elastic and Piezoelectric Coefficients of Single-Crystal Barium Titanate," Physical Review, vol. 111, No. 1, published Jul. 1, 1958, (pp. 143-148).
Boyd, "The Electrooptic and Photorefractive Effects," Chapter 11 in Nonlinear Optics (Third Edition), Academic Press, 2018, (pp. 511-541).
Bozovic, et al., "Epitaxial Strain and Superconductivity in La2-xSrxCu04 Thin Films," Physical Review Letters, vol. 89, No. 10, published Sep. 2, 2002, (4 pages).
Choi, et al., "Enhancement of Ferroelectricity in Strained BaTiO3 Thin Films," Science, vol. 306, published Nov. 5, 2004, (pp. 1005-1009 with cover page).
Devonshire, "CIX. Theory of barium titanate—Part II," The London, Edinburgh, and Dublin Philosophical Magazine and Journal of Science, Ser. 7, vol. 42, No. 333, <https://www.tandfonline.com/doi/abs/10.1080/14786445108561354> dated Oct. 1951, (pp. 1065-1079 with cover page).
Devonshire, "XCVI. Theory of barium titanate," The London, Edinburgh, and Dublin Philosophical Magazine and Journal of Scince, Philosophical Magazine, vol. 40, Iss. 309, (pp. 1040-1063 with cover page).

Eom, et al., "Fabrication and properties of epitaxial ferroelectric heterostructures with (SrRuO3) isotropic metallic oxide electrodes," Applied Physics Letters, vol. 63, No. 18, published Nov. 1, 1993, (pp. 2571-2572 with cover page).
Eom, et al., "Single-Crystal Epitaxial Thin Films of the Isotropic Metallic Oxides Sr1-xCaxRuO3 (0≤x≤1)," Science, vol. 258, No. 5089, dated Dec. 11, 1992, (pp. 1766-1769 with cover page).
Fong, et al., "Ferroelectricity in Ultrathin Perovskite Films," American Association for the Advancement of Science, Science, vol. 304, published Jun. 11, 2004, (pp. 1650-1653 with cover page).
Fox, et al., "Thermal Hysteresis of Optical Second Harmonic in Paraelectric BaTiO3," Materials Letters, vol. 9, No. 7, 8, published Apr. 1990 (pp. 284-288).
Gan, et al., "Direct measurement of strain effects on magnetic and electrical properties of epitaxial SrRuO3 thin films," Applied Physics Letters, vol. 72, No. 8, <https://aip.scitation.org/doi/10.1063/1.120603> published Feb. 23, 1998, (pp. 978-980 with cover page).
Geller, "Crystallographic Studies of Perovskite-Like Compounds. IV. Rare Earth Scandates, Vanadites, Galliates, Orthochromites," Acta Cryst. vol. 10, published 1957, (pp. 243-248).
Gill, et al., "Thin-film channel waveguide electro-optic modulator in epitaxial BaTiO3," Applied Physics Letters, vol. 71, No. 13, published Sep. 29, 1997, (pp. 1783-1785 with cover page).
Haeni, et al., "RHEED Intensity Oscillations for the Stoichiometric Growth of SrTiO3 Thin Films by Reactive Molecular Beam Epitaxy," Journal of Electroceramics, vol. 4, No. 2/3, published 2000, (pp. 385-391).
Haeni, et al., "Room-temperature ferroelectricity in strained SrTiO3," Letters to Nature, vol. 430, published Aug. 12, 2004, (pp. 758-761).
Hellwege, et al., "Numerical Data and Functional Relationships in Science and Technology," Landolt-Börnstein, New Series—Group III, vol. 16a, 1981, (pp. 67, 73, 74 with cover page).
Hellwege, et al., "Numerical Data and Functional Relationships in Science and Technology," Landolt-Börnstein, New Series—Group III, vol. 7e, 1976, (pp. 11-13 with cover page).
Hellwege, et al., "Numerical Datal and Functional Relationships in Science and Technology," Landolt-Börnstein, New Series—Group III, vol. 11, 1979, (pp. 33-38, 418-422 with cover page).
International Search Report and Written Opinion for Application No. PCT/SG2020/050166 dated Aug. 11, 2020 (13 pages).
Jaffe, et al., "Piezoelectric Ceramics," Academic Press, 1971, (p. 78).
Johnston, et al., "Determination of the Low-Frequency Linear Electro-Optic Effect in Tetragonal BaTiO3," Journal of the Optical Society of America, vol. 55, No. 7, published Jul. 1965, (pp. 828-834).
Jona, et al., "Ferroelectric Crystals," Chapter IV: Barium Titanate, Pergamon Press, published 1962, (pp. 108-215 with cover page).
Junquera, et al., "Critical thickness for ferroelectricity in perovskite ultrathin films," Letters to Nature, Nature, vol. 422, published Apr. 3, 2003, (pp. 506-509).
Kay, et al., "XCV. Symmetry changes in barium titanate at low temperatures and their relation to its ferroelectric properties," The London, Edinburgh, and Dublin Philosophical Magazine and Journal of Science, <https://doi.org/10.1080/14786444908561371> published Jul. 29, 2010, (pp. 1019-1040 with cover page).
Kim, et al., "Pulsed laser deposition of BaTiO3 thin films and their optical properties," Applied Physics Letters, vol. 67, No. 13, published Sep. 25, 1995, (pp. 1803-1805 with cover pages).
Kim, et al., "Ridge waveguide using highly oriented BaTiO3 thin films for electro-optic application," Journal of Asian Ceramic Societies, vol. 2., Iss. 3, published online Jun. 5, 2014, (pp. 231-234 with cover page).
Leroy, et al., "Guided-wave electro-optic characterization of BaTiO3 thin films using the prism coupling technique," Optic Letters, vol. 38, No. 7, published Apr. 1, 2013, (pp. 1037-1039).
Li, et al., "Phase-field model of domain structures in ferroelectric thin films," Applied Physics Letters, vol. 78, No. 24, <https://aip.scitation.org/doi/10.1063/1.1377855> published Jun. 11, 2001, (pp. 3878-3880 with cover page).
Matthews, et al., "Defects in Epitaxial Multilayers," Journal of Crystal Growth, vol. 27, (pp. 118-125).

(56) References Cited

OTHER PUBLICATIONS

McClune, et al., "Powder Diffraction File: Sets 27 to 28," JCPDS International Centre for Diffraction Data, published 1986, (p. 72, Card 27-204).

McClune, et al., "Powder Diffraction File: Sets 27 to 28," JCPDS International Centre for Diffraction Data, published 1986, (p. 78, Card 27-220).

Nagarajan, et al., "Thickness dependence of structural and electrical properties in epitaxial lead zirconate titanate films," Journal of Applied Physics, vol. 86, No. 1, <https:/aip.scitation.org/doi/10.1063/1.370772> dated Jul. 1, 1999, (pp. 595-602 with cover page).

Neaton, et al., "Theory of polarization enhancement in epitaxial BaTiO3/SrTiO3 superlattices," Applied Physics Letters, vol. 82, No. 10, <https://aip.scitation.org/doi/10.1063/1.1559651> dated Mar. 10, 2003, (pp. 1586-1588 with cover page).

Nix, "Mechanical Properties of Thin Films," The 1988 Institute of Metals Lecture: The Minerals, Metals & Materials Society, vol. 20A, Nov. 1989 (pp. 2217-2245).

Nix, et al., "Crystallite coalescence: A mechanism for intrinsic tensile stresses in thin films," Journal of Materials Research, vol. 14, No. 8, dated Aug. 1999, (pp. 3467-3473).

Pertsev, et al., "Effect of Mechanical Boundary Conditions on Phase Diagrams of Epitaxial Ferroelectric Thin Films," Physical Review Letters, vol. 80, No. 9, dated Mar. 2, 1998, (pp. 1988-1991).

Petraru, et al., "Ferroelectric BaTiO3 thin-film optical waveguide modulators," Applied Physics Letters, vol. 81, No. 8, <https://doi.org/10.1063/1.1498151>published Aug. 9, 2002, (4 pages).

Petraru, et al., "Integrated optical Mach-Zehnder modulator based on polycrystalline BaTiO3," Optics Letters, Vo. 28, No. 24, published Dec. 15, 2003 (pp. 2527-2529).

Ramesh, et al., "Fatigue and retention in ferroelectric Y—Ba—Cu—O/Pb—Zr—Ti—O/Y—Ba—Cu—O heterostructures," Applied Physics Letters, vol. 61, No. 13, published Sep. 28, 1992, (pp. 1537-1539 with cover page).

Roessler, et al., "Magnesium Oxide (MgO)," Handbook of Optical Constants of Solids, published 1998, (pp. 919-955).

Sato, et al., "Increase in the superconducting transition temperature by anisotropic strain effect in (001) La1.85Sr0.15Cu04 thin films on LaSrAlO4 substrates," Physica C, vol. 274, published 1997, (pp. 221-226).

Schubert, et al., "Structural and optical properties of epitaxial BaTiO3 thin films grown on GdScO3(110)," Applied Physics Letters, vol. 82, No. 20, <https://aip.scitation.org/doi/10.1063/1.1575935> published May 19, 2003, (pp. 3460-3462 with cover page).

Sepliarsky, et al., "Ferroelectric phase transitions and dynamical behavior in KNbO3/KTaO3 superlattices by molecular-dynamics simulation," Journal of Applied Physics, vol. 91, No. 5, <https://aip.scitation.org/doi/10.1063/1.1435826> dated Mar. 1, 2002, (pp. 3165-3171 with cover page).

Sharan, et al., "Bismuth manganite: A multiferroic with a large nonlinear optical response," Physical Review B, vol. 69, published Jun. 25, 2004 (7 pages).

Specht, et al., "X-Ray Diffraction Measurement of the Effect of Layer Thickness on the Ferroelectric Transition in Epitaial KTaO3/KNbO3 Multilayers," Pysical Review Letters, vol. 80, No. 19, dated May 11, 1998, (pp. 4317-4320).

Speck, et al., "Domain configurations due to ultiple misfit relaxation mechanisms in epitaxial ferroelectric thin films. III. Interfacial defects and domain misorientations," Journal of Applied Physics, vol. 78, No. 3, <https://aip.scitation.org/doi/10.1063/1.360267> dated Aug. 1, 1995, (pp. 1696-1706 with cover page).

Streiffer, et al., "Observation of Nanoscale 180° Stripe Domains in Ferroelectric PbTiO3 Thin Films," Physical Review Letters, vol. 89, No. 6, dated Aug. 5, 2002 (4 pages).

Tang, et al., "Electrooptic modulation up to 40 GHz in a barium titanate thin film waveguide modulator," Optics Express, vol. 12, No. 24, published 5967 Nov. 29, 2004, (pp. 5962-5967).

Tang, et al., "Low-Loss Electrooptic BaTiO3 Thin Film Waveguide Modulator," IEEE Photonics Technology Letters, vol. 16, No. 8, Aug. 2004, (pp. 1837-1839).

Unknown, "International Technology Roadmap for Semiconductors: Front End Processes," Semiconductor Industry Association, San Jose, CA, 2003, (62 pages).

Wang, et al., "Epitaxial BiFeO3 Multiferroic Thin Film Heterostructures," Science vol. 299, Issue 5613, <https://www.science.org/doi/10.1126/science.1080615> dated Mar. 14, 2003, (pp. 1719-1722).

Wang, et al., "Integrated lithium niobate electro-optic modulators operating at CMOS-compatible voltages," Nature 562, <https://www.nature.com/articles/s41586-018-0551-y> Sep. 24, 2018, (pp. 101-112).

Wemple, et al., "Dielectric and Optical Properties of Melt-Grown BaTiO3," Journal of Physical Chemical Solids, vol. 29, published 1968 (pp. 1797-1803).

Wessels, "Ferroelectric Epitaxial Thin Films for Integrated Optics," Annual Review of Materials Research, vol. 37, published 2007, (pp. 659-679).

Xiong, et al., "Active Silicon Integrated Nanophotonics: Ferroelectric BaTiO3 Devices," Nano Letters, vol. 14, published 2014, (pp. 1419-1425).

Yamada, "Electromechanical Properties of Oxygen-Octahedra Ferroelectric Crystals," Journal of Applied Physics, vol. 43, No. 2, published Feb. 1972, (pp. 328-338 with cover page).

Yanase, et al., "Thickness Dependence of Ferroelectricity in Heteroepitaxial BaTiO3 Thin Film Capacitors," Japanese Journal of Applied Physics, vol. 38, No. 9B, Part 1, dated Sep. 1999, (pp. 5305-5308 with cover page).

* cited by examiner

STRUCTURE FOR AN OPTOELECTRONICS PLATFORM AND METHOD OF FABRICATING A STRUCTURE FOR AN OPTOELECTRONICS PLATFORM

CROSS REFERENCE TO RELATED APPLICATIONS

This application is a national stage filing under 35 U.S.C. § 371 of International Patent Application No.: PCT/SG2020/050166, filed Mar. 26, 2020, which claims priority to Singapore Patent application Ser. No. 10201902663T, filed Mar. 26, 2019, and Singapore Patent Application No. 10201903163Y, filed Apr. 9, 2019 the entire contents of all of which are hereby incorporated by reference herein.

FIELD OF INVENTION

The present invention relates broadly to a structure for an optoelectronics platform and to a method of fabricating a structure for an optoelectronics platform, in particular to a barium titanate-based optoelectronics platform.

BACKGROUND

Any mention and/or discussion of prior art throughout the specification should not be considered, in any way, as an admission that this prior art is well known or forms part of common general knowledge in the field.

Electro-optic modulators make essential building blocks of high-speed interconnects, where the high-speed requirements exclude direction modulation of the laser. For these devices, the output from an external laser is coupled into an electro-optic modulator where it is modulated via the Pockels effect. The Pockels effect describes an electric-field tuning of the permittivity tensor. This field effect change can be used to modulate the phase, intensity, or polarization of the in-coupled laser light. Electro-optic modulators are typically fabricated in lithium niobate, a crystal with a large nonlinear coefficient. In particular, lithium niobate's Pockels coefficient is around 30 pm/V. This value is directly proportional to the voltage needed to induce a π-phase shift and is thus directly related to both the speed of a modulator, size of a modulator, and required driving voltage.

In $BaTiO_3$ (barium titanate, BTO), the Pockels coefficient can reach over 1000 pm/V, so there is a strong motivation to explore possible use of this material, because substantial improvement in speed of a modulator, size of a modulator, and required driving voltage can result. The key impediments to using BTO in the past included the difficulty of achieving good optical thin film crystal quality, difficulty of achieving vertical index contrast such that waveguiding within the BTO layer is possible, and difficulty of achieving good lateral index contrast such that optoelectronics devices such as modulators and waveguides can be fabricated.

It is noted that while BTO thin films have also been specifically investigated for ferroelectric applications, e.g. as described in US 2006/0091434, taking advantage of induced strain in ultra-thin BTO films with thicknesses below a critical thickness of relaxation towards a zero-strain state. However, those investigations do not take into account any waveguiding and Pockels coefficient properties of the BTO films.

Embodiments of the present invention seek to address at least one of the above problems.

SUMMARY

In accordance with a first aspect of the present invention, there is provided a structure for an optoelectronics platform comprising:
a substrate, and
a $BaTiO_3$, BTO, film deposited on a surface of the substrate and having a thickness suitable for single mode operation with one or more possible polarization configurations with optical confinement in the BTO film at a wavelength or wavelength range of operation;
wherein the substrate provides vertical refractive index confinement in a direction perpendicular to the surface of the substrate for the single mode operation optical confinement in the BTO film at the wavelength or wavelength range of operation.

In accordance with a second aspect of the present invention, there is provided a method of fabricating a structure for an optoelectronics platform, the method comprising the steps of:
providing a substrate, and
depositing a $BaTiO_3$, BTO, film on a surface of the substrate and having a thickness suitable for single mode operation with one or more possible polarization configurations with optical confinement in the BTO film at a wavelength or wavelength range of operation;
wherein the substrate is chosen to provide vertical refractive index confinement in a direction perpendicular to the surface of the substrate for the single mode operation optical confinement in the BTO film at the wavelength or wavelength range of operation.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
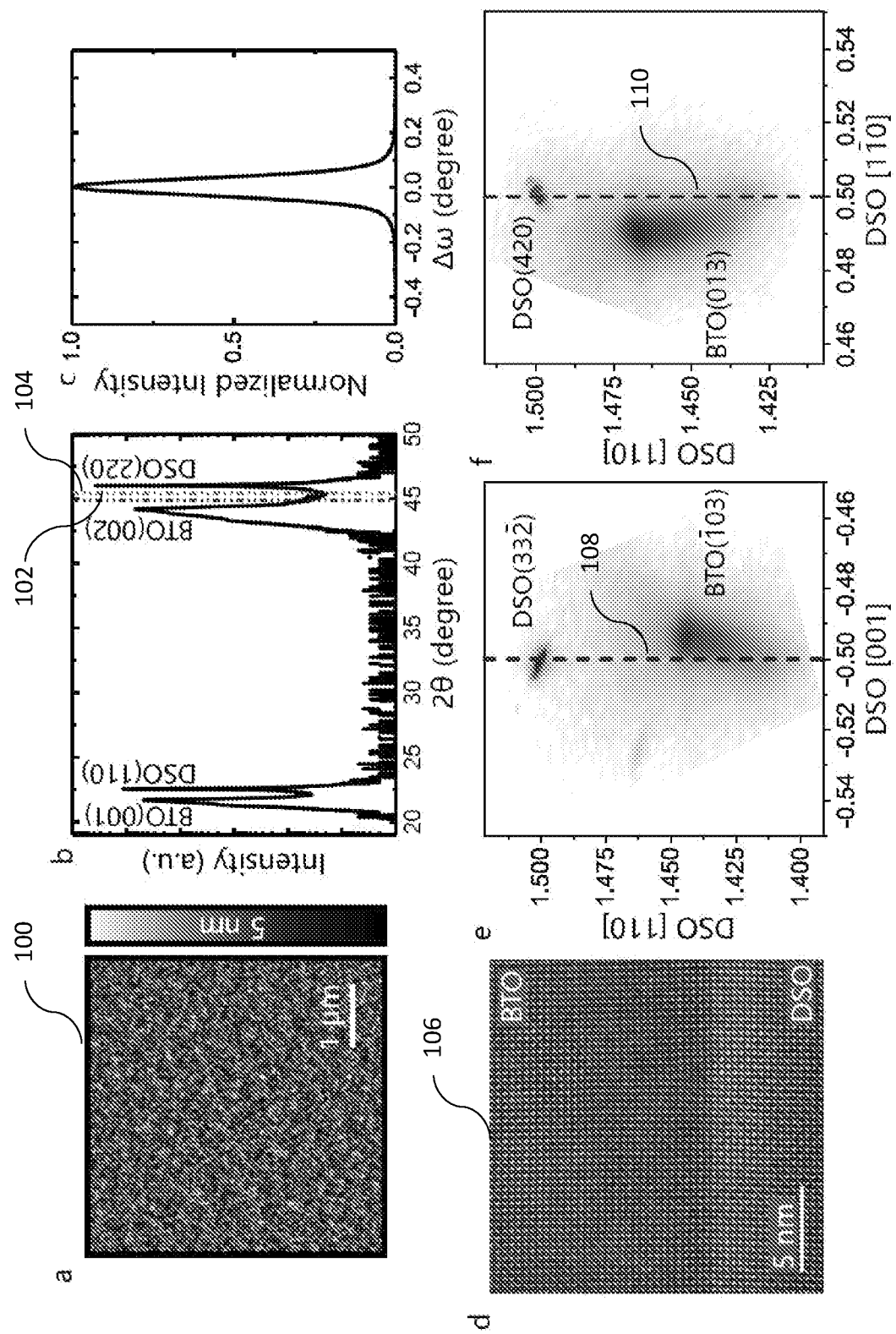
FIG. 1(a) shows atomic force microscopy (AFM) morphology image showing small roughness at the BTO surface of BTO on DSO, with RMS roughness of 754 pm, according to an example embodiment.
FIG. 1(b) shows X-ray diffraction (XRD) 2θ-ω coupled scan showing that BTO film is pure c-axis single crystal, according to an example embodiment.
FIG. 1(c) shows the small FWHM of 0.075 degree in the rocking curve at BTO (002) Bragg peak verify the high crystal quality of the BTO film, according to an example embodiment.
FIG. 1(d) shows high resolution scanning transmission electron microscope (STEM) cross-sectional image of BTO on DSO showing high crystalline quality and BTO's c-axis being orthogonal to the interface, according to an example embodiment.
FIG. 1(e) shows XRD reciprocal space mapping (RSM) of BTO (−103) plane showing the relaxed nature of BTO film. Red dash line labels the fully strained lattice constant, according to an example embodiment.
FIG. 1(f) shows XRD RSM of BTO (103) plane showing the relaxed nature of BTO film. Red dash line labels the fully strained lattice constant, according to an example embodiment.

The BTO based electro-optic modulator according to example embodiment can advantageously be more compact, higher speed, and with lower driving voltage than current lithium niobate technology. $DyScO_3$ (Dysprosium scandate, DSO) used as a substrate according to example embodiments has a much smaller refractive index than BTO, providing good optical confinement. These improvements enable shrinking of chip size and reduce the mismatch between the electrical mode and optical mode along the length of the electrode. This in turn causes a significant improvement (lowering) of the drive voltage requirements, greatly reducing the cost of the drive electronics. Careful matching of BTO's high permittivity with the microwave mode should also allow for a very high estimated 3-dB bandwidth, likely >140 Gbps. In lithium niobate modulators, the ultimate speed is limited by the mismatch of the optical mode with electrical mode propagating down the lateral electrodes. A shorter modulator enables better matching and better ultimate speed. Since the barium titanate modulator according to example embodiments can be much shorter, a much better ultimate speed is expected.

Sample Growth According to a Non-Limiting Example Embodiment

Substrate Choice

DSO is used as substrate for BTO growth as DSO advantageously has much lower refractive index than BTO, thus it can provide better confinement to the optical modes, which allow closer spacing of the modulating electrodes to the BTO optical fiber/waveguide, as a result the size of devices according to example embodiments can be reduced.

The relatively small lattice mismatch between DSO (a=0.3946 nm, b=0.3952 nm in the pseudo-cubic view) and BTO (a=0.3992 nm) advantageously enables high quality single crystal growth, which leads to large effective $r_{42}$ (or $r_{51}$).

$La_{0.3}Sr_{0.7}Al_{0.65}Ta_{0.35}O_3$ (LSAT), $LaSrAlO_4$ (LSAO), and the scandate family with similar such properties, such as/including $GdScO_3$, $SmScO_3$, $TbScO_3$, $NdScO_3$, $HoScO_3$, $ErScO_3$, $TmScO_3$, $YbScO_3$, $LuScO_3$, $PrScO_3$, $LaScO_3$, $YScO_3$, are good alternatives of DSO, according to different example embodiments.

According to an example embodiment, the DSO substrate is annealed at 1000° C. for 4 hours in atmosphere to improve the substrate surface BTO Growth According to an example embodiments, the BTO thin film is grown by pulsed laser deposition (PLD) on DSO substrate at 600-900° C. under 1-20 mTorr, with cooling and post-annealing at 650° C. for 30-60 minutes in oxygen atmosphere (200 Torr). Reflection high energy electron diffraction (RHEED) is used to monitor growth rate at the beginning of the growth, and the number of laser pulses is calculated for the desired film thickness using the growth rate.

High quality single crystal c-axis BTO film grown on DSO substrate according to an example embodiment was also characterized through use of X-ray diffraction (XRD) over a wide range of temperatures, fabricated single-mode waveguides, and verified low loss and a strong electro-optic effect as demonstrated through polarization modulation. The r parameters of the BTO film were also extracted.

Growth quality of an example 850 nm-thick BTO film grown on a DSO 15 $mm^2$ substrate by pulsed laser deposition according to an example embodiment is demonstrated in FIG. 1, illustrating a smooth surface and high single crystallinity. Specifically, FIG. 1(a) shows that the RMS roughness is 754 pm, determined from atomic force microscopy (AFM) morphology image 100 showing small roughness at the BTO surface of BTO on DSO, and this smooth surface helps reduce light scattering in resultant waveguides.

The BTO films have a single (001)/c-axis orientation, and are very well aligned, as indicated in FIGS. 1(b) and (c), respectively. FIG. 1(b) shows an X-ray diffraction (XRD) 1θ-ω coupled scan illustrating that BTO film is pure c-axis single crystal. The dash-dot lines 102, 104 indicate the Bragg angle for bulk c-axis and a-axis, respectively. FIG. 1(c) illustrates a small FWHM of 0.075 degree in the rocking curve at the BTO (002) Bragg peak verifying the high crystal quality of the BTO film. High crystal quality microscopically is further illustrated by the high resolution scanning transmission electron microscope (STEM) cross-sectional image 106 in FIG. 1(d). For waveguide applications, a few hundred nm of thickness is required for the BTO to achieve mode confinement, and thus the BTO films are partially relaxed from their fully strained state. FIGS. 1(e) and (f) show XRD RSM of BTO (-103) and (103) plane, respectively, showing the relaxed nature of the BTO film according to an example embodiment. Dash lines 108, 110 indicate the fully strained lattice constants for comparison.

Figure 2:
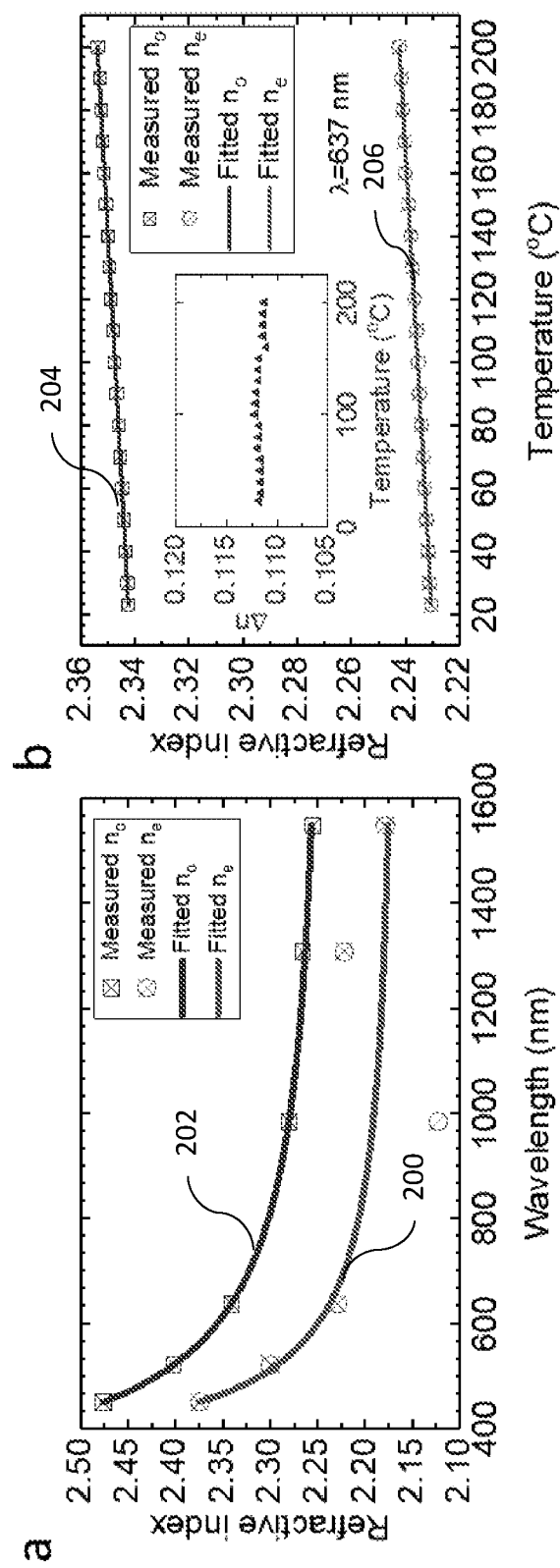
FIG. 2(a) shows refractive indices of 850 nm BTO on DSO according to an example embodiment as function of wavelength.
FIG. 2(b) shows measured refractive indices as function of temperature for BTO film according to an example embodiment.

The refractive indices $n_o$ and $n_e$ (curves 200, 202, respectively) of the BTO film on DSO according to an example embodiment are measured with the prism coupling method as a function of wavelength, as shown in FIG. 2(a), and subsequently fitted with the Sellmeier equation. $n_o$ follows the dispersion trend nicely; for $n_e$ the fitted curve at long wavelengths (984 nm, 1308 nm) has a poorer match because the small substrate sizes make TM modes more difficult to couple into the slab; missing modes can result in an incorrect estimate of the index. The trends are otherwise likely highly accurate.

It is worth noting that for DSO (110) used as the substrate according to an example embodiment, the in-plane lattice constants are not equal (a≠b), thus the lattice of grown BTO films seems to follow the substrate at an early growth stage, causing in-plane anisotropy, but as BTO films thicken, relaxation would be expected to decrease this difference. Therefore, refractive indices for both directions were measured at 637 nm wavelength and only a small difference of 0.009 was noted.

Bulk BTO has a Curie temperature ($T_C$) of 125° C. which would ordinarily present potential process challenges[15], but the $T_C$ in thin films is typically higher due to strain from substrate clamping. For fully strained (50 nm) BTO-on-DSO, the $T_C$ is known to increase to 500° C.[16], but such a thin BTO layer would be unsuitable for optoelectronics purposes. An appropriate thickness would be a few hundred nanometers, where the strain on the film is partially relaxed, with the $T_C$ expected to be lower than fully strained BTO but higher than in bulk. FIG. 2(b) presents refractive indices at elevated temperatures for an 850 nm thick BTO film on DSO according to an example embodiment; both $n_o$ and $n_e$ (curves 204, 206) increase linearly and do not coincide up to 200° C., indicating that the $T_C$ is at least higher than 200° C. Note that the birefringence is almost unchanged as temperature increases, maintaining a stable optical property. The temperature range of index measurement is limited by the instrument.

Figure 3:
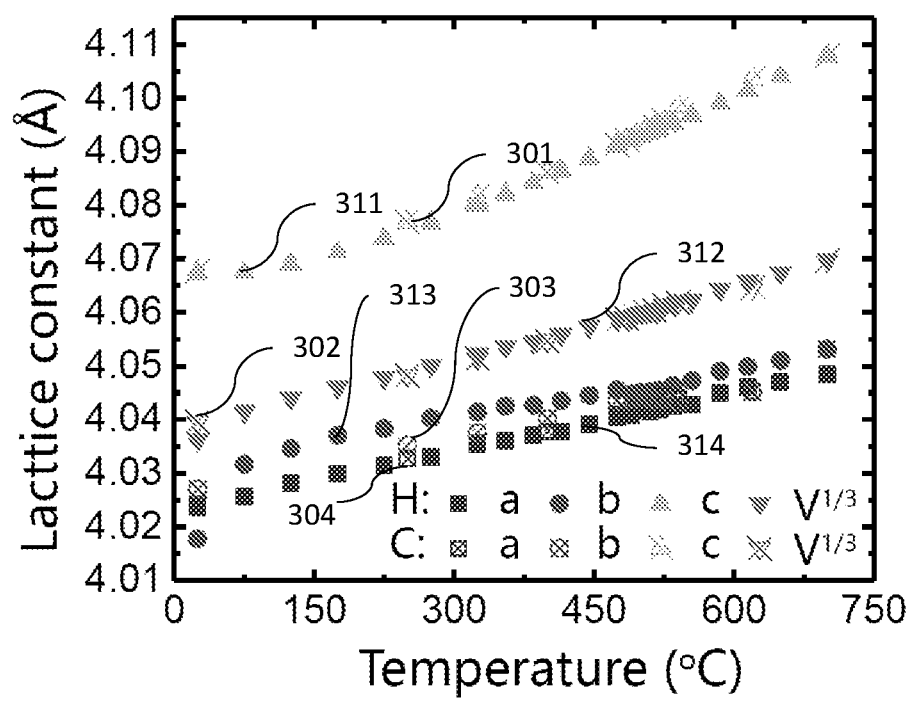
FIG. 3 shows lattice constant a, b, c and unit cell volume V of 500 nm BTO on DSO according to an example embodiment as function of temperature measured by XRD RSM.

The low $T_C$ of 125° C. would normally create difficulties for fabrication processes, because the structural phase transition which occurs due to heating (during etching, for example) can cause BTO to crack. However, BTO in the thin film form is much more stable due to the increased $T_C$ and substrate clamping. The lattice constants of a 500 nm-thick BTO film on DSO according to an example embodiments was measured as a function of temperature (while both heating and cooling) by X-ray diffraction. The results shown in FIG. 3 show the lattice constants while cooling down (symbols 301-404) track the values while heating up (symbols 311, 314) at temperatures up to 700° C., indicating no phase transitions or cracking, thus advantageously permitting all ordinary lithography, etching, and other fabrication processes.

Design and Fabrication Method According to a Non-Limiting Example Embodiment

Design of Modulator

Figure 4:
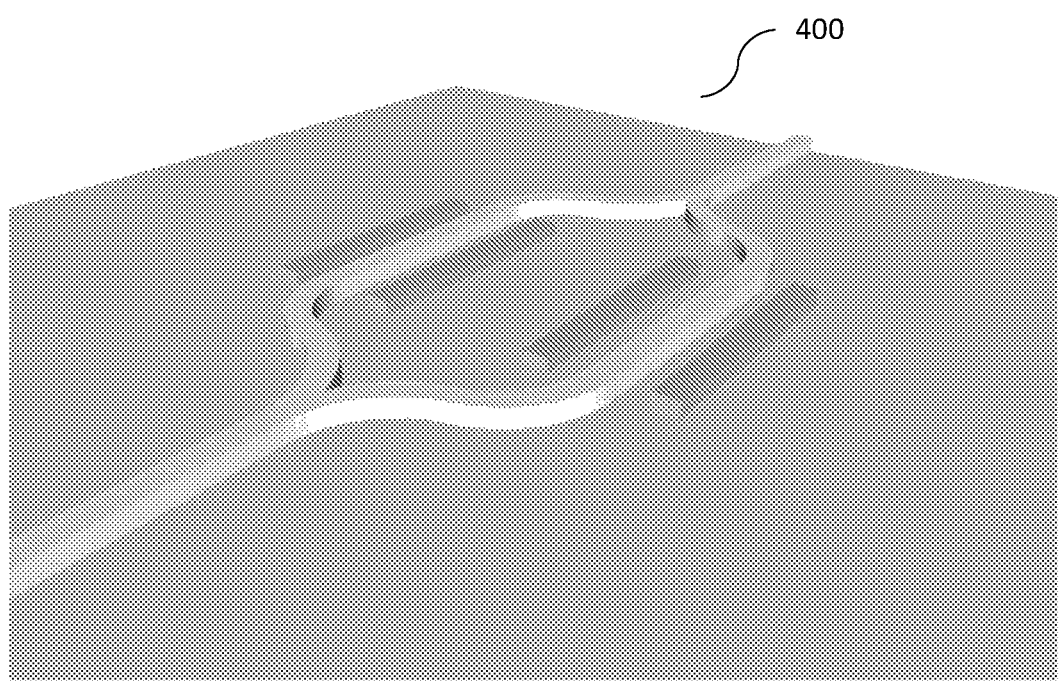
FIG. 4 shows a schematic of a Mach-Zehnder modulator into which an example embodiment can be incorporated.

In traditional lithium niobate modulators, phase modulation is converted into amplitude modulation via a Mach-Zehnder modulator type device e.g. 400 shown in FIG. 4. This configuration is also possible in BTO and results in shorter interaction lengths than in lithium niobate which the inventors have verified by simulation.

Specifically, in a Mach-Zehnder configuration in BTO, assuming linear x-polarized input prior to the beam split (where x is laterally oriented and z is vertically oriented, corresponding to the crystallographic a and c axes), the output can also be linearly x-polarized—in this case the extinction ratio after the two interferometer branches are recombined can reach nearly 100% which we have verified through simulation, and this can take place within a few hundred microns. The Mach-Zehnder device length according to an example embodiment is thus much shorter than in lithium niobate.

More specifically, unlike e.g. in lithium niobite, where one arm just has a phase slip relative to the other and constructive and destructive interference occurs with the other arm, in barium titanate, one arm without an applied field has undisturbed basis vectors and the other with an applied field has disturbed basis vectors. When the basis vectors are rotated even a by a small amount, this means there will not be much power cycling to the z direction (assuming the light starts in the x direction), but power cycling still occurs. What will change is the mode index (as barium titanate is birefringent with $n_z$ not equal to $n_x$), it can be thought of as a change of waveguide geometry as seen by the light. With a different mode index, light propagates at a different speed and an effective phase slip occurs. This cannot easily be characterized without simulation, but the inventors have observed that effectively a Mach-Zehnder configuration in barium titanate yields a much shorter modulator than in lithium niobate. The power effectively spends some time propagating with $n_z$ and some time propagating with $n_x$, and since these two indices are much more different from one another than the small difference in just $n_z$ imparted along a lithium niobate branch, effectively a large phase slip is accumulating relative to a reference branch without applied field.

Another modulator device configuration which also makes use of the strongest $r_{42}$ parameter, which continuously rotates the polarization state during propagation, as a polarization modulator alone or in combination with phase modulation is implemented according to a preferred embodiment, which will now be described.

As BTO is tetragonal crystal with 4 mm symmetry and the $r_{42}$ parameter (equivalently $r_{51}$) has the highest coefficient, to target the $r_{42}$ parameter, it is preferred to orient polarization of light in plane to be the same as the crystal a-axis (or any axis perpendicular to the c-axis) and apply the electric field along the a-axis as well (or perpendicular to the c-axis). This produces a permittivity tensor as shown in (1) below, with off-diagonal elements now accessed; this is a key difference between BTO and lithium niobate (LN), where the LN $r_{33}$ parameter affects only diagonal elements.

$$\varepsilon = \begin{bmatrix} \varepsilon_x & 0 & -\varepsilon_0 n_o^2 n_e^2 r_{42} E_x \\ 0 & \varepsilon_y & 0 \\ -\varepsilon_0 n_o^2 n_e^2 r_{42} E_x & 0 & \varepsilon_z \end{bmatrix} \quad (1)$$

This off diagonal element causes cycling of polarization (in this case) between x- and z-polarizations (and mixtures of these, depending on initial polarization), with intermediate stages of elliptical polarization if the propagation direction is along y. For example, a waveguide designed such that both x- and z-polarization states are supported can be configured such that the input polarization is linear in x. Without the applied electric field $E_x$, the polarization state is unchanged during propagation. With the applied electric field $E_x$, the polarization state becomes increasingly elliptical with both x and z components as it propagates in the y direction, with both the maximum amount of optical power in the z-polarization state and the distance at which this maximum is achieved depending on the electrical field strength $E_x$. With suitable x-polarized light at the input port and a z-polarizer at the output, the modulator length (single waveguide) can be in the range of dozens of microns, rather than the millimeter-range typical of Mach-Zehnder interferometers used in lithium niobate.

Figure 5:
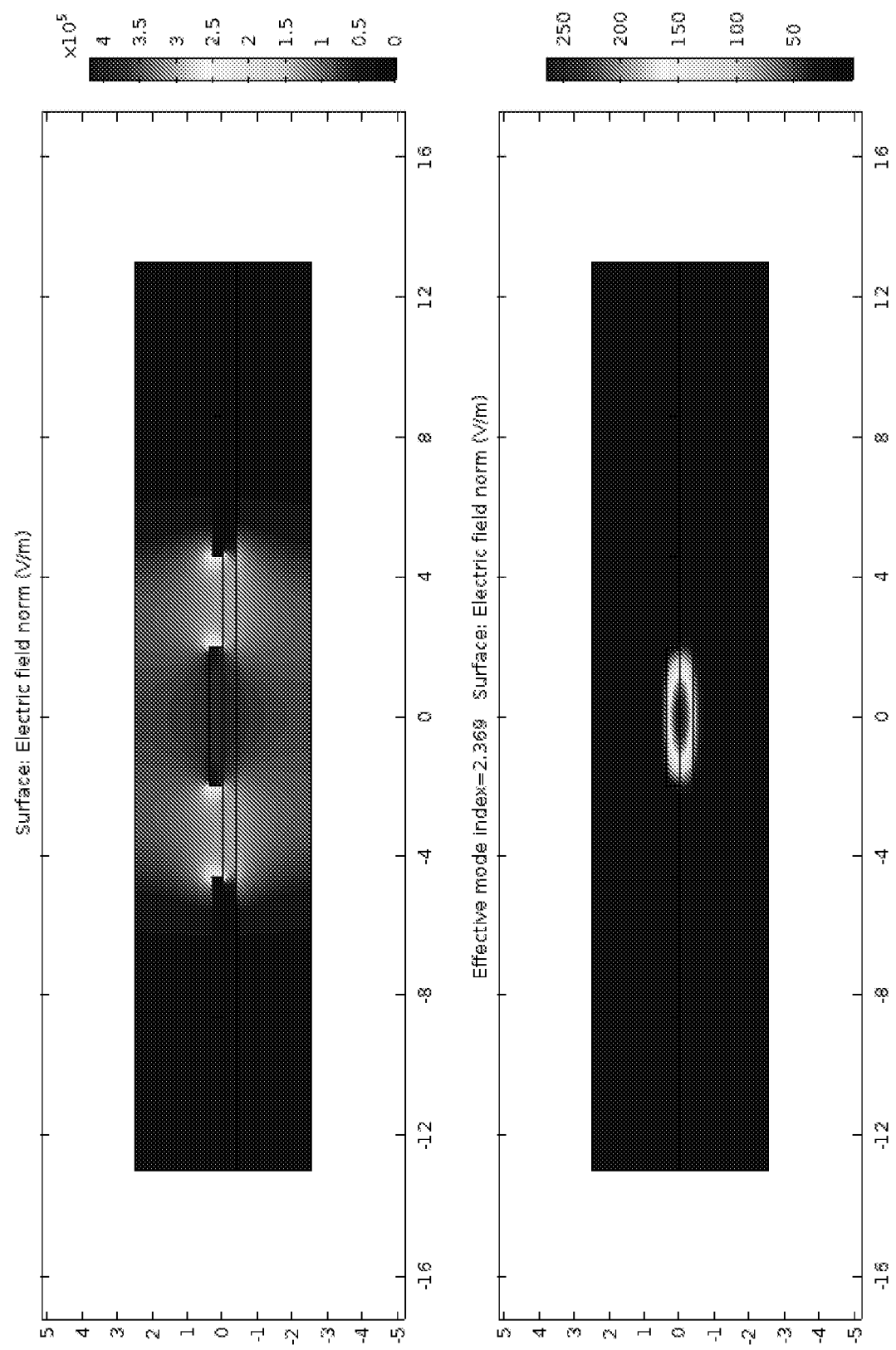
FIG. 5 shows electrostatic (top) and electromagnetic (bottom) simulation of a single waveguide according to an example embodiment, showing the electric field distribution and the optical field distribution respectively.

Electrical and electromagnetic simulations were performed to correctly design both the microwave and optical aspect of the electrodes and an example waveguide. These results are shown in FIGS. 5(a) and (b), respectively. These simulation results show that electric field applied extends uniformly across the BTO, and optical modes is well confined inside BTO. The overlap of the microwave (electric) field and the optical field will form the electro-optic effect in the BTO.

Fabrication

After growth of BTO on DSO via PLD as described above, 100 nm of chromium is deposited on top of the BTO via electron beam evaporator. Subsequently, resist is spin-coated and patterned via electron beam lithography. After development of the resist, the chromium is wet etched away. This provides a double-layer mask. Subsequently an optimized ion milling or RIE or ICP etching step is used to physically etch the exposed BTO layer, etching down a rib waveguide on BTO. The rib height is optimized to be sufficiently high to allow for compact structures, but not too high as to incur sidewall losses.

After ion milling, any remaining resist and chromium are removed via acetone/wet etchant.

Results

Figure 6:
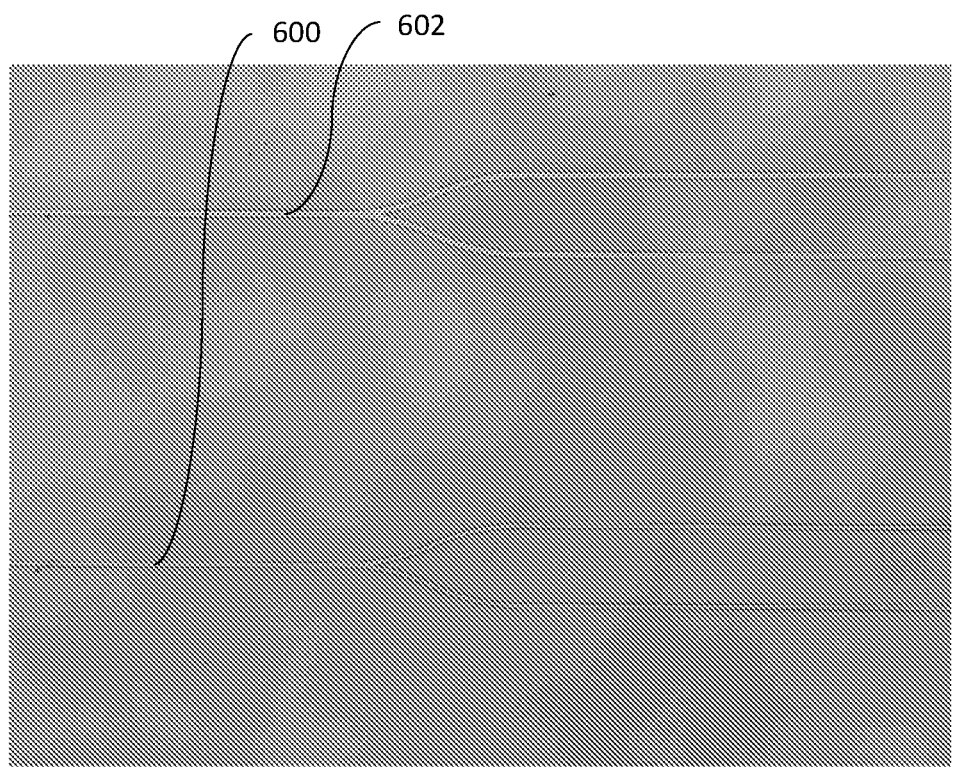
FIG. 6 shows an optical Image of example waveguides in BTO with splitters, according to example embodiments.

The post etching and lift-off result of fabricated BTO waveguides 600, 602 on DSO according to an example embodiment is shown in FIG. 6. Optical inspection shows that these modulators are of high quality. When telecommunication wavelength light (1550 nm) was coupled into the BTO waveguides 600, 602, the scattering from the waveguide 600, 602 is very low, indicative of a low propagation loss.

Figure 7:
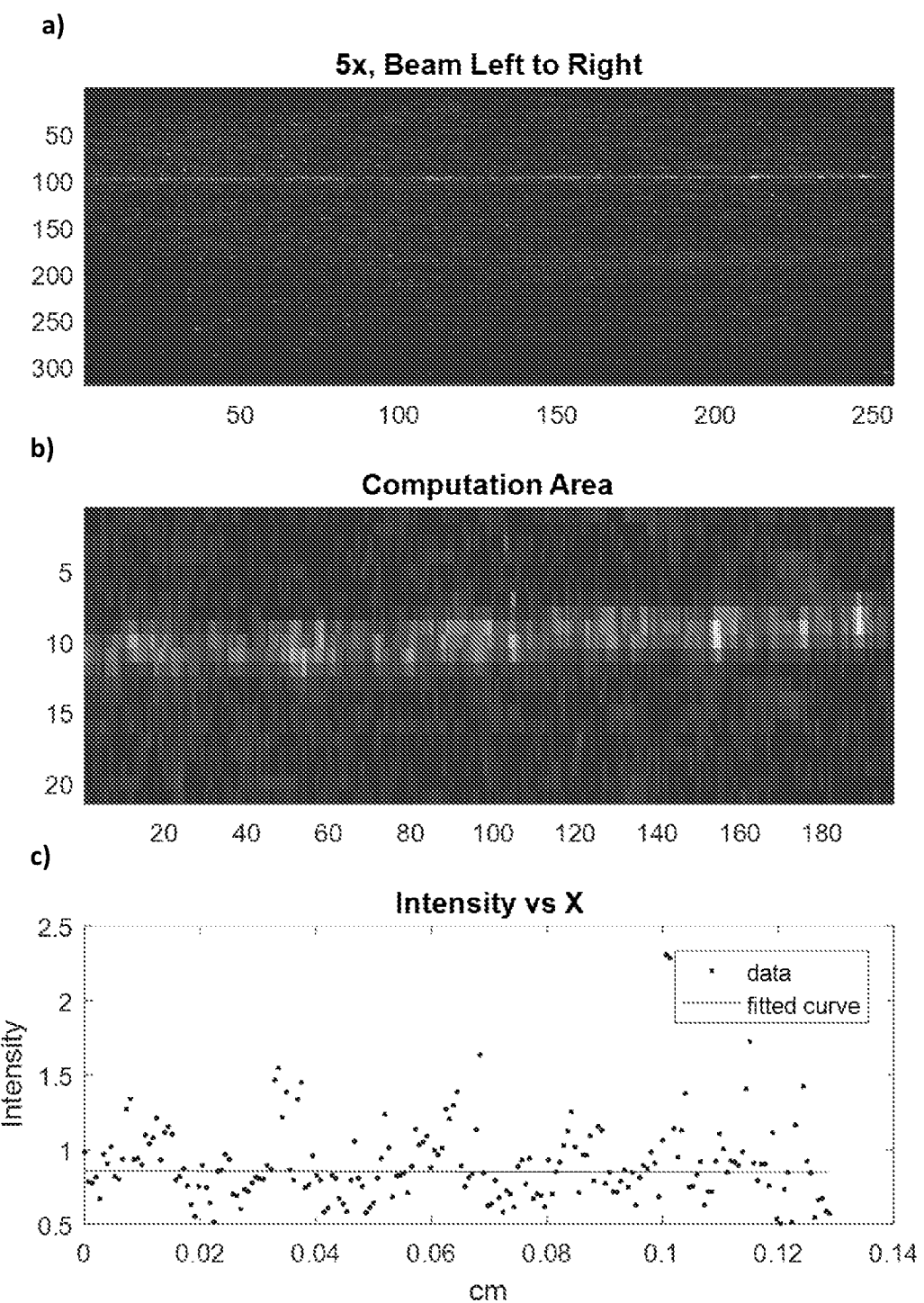
FIG. 7 illustrates propagation loss characterization showing a very low estimated loss of under 2 dB/cm, according to an example embodiment.

This propagation loss has been characterized by the Fabry-Perot method (shown in FIG. 9) and optical image method (shown in FIG. 7(a) to (c)), showing an estimated loss of under 2 dB/cm or better. Due to the low amount of scattering from the BTO waveguide according to an example embodiment, it was not practical to characterize the noise efficiently as the scattered power is quite low: the power decay is not evident over a propagation of 2 mm. The optical image method is an optical method to determine loss, using a low magnification lens. In the optical image method, the straight waveguide is loaded under an optical microscope and a picture (FIG. 7(a)) taken for the scattered light along the waveguide from the roughness.

Then the light intensity of the light spot averaged for the same propagation distance over a computation area (FIG. 7(b)) is plotted against the propagation distance x (FIG. 7(c)), and thus loss is estimated. The light read by the lens directly correlates to the scattering from the waveguide (which should be proportional to the loss). In FIG. 7(c), the fitted curve should show the loss in dB/cm.

The low loss of the BTO etched waveguide indicate that BTO is suitable for waveguides based optical devices designs.

Figure 8:
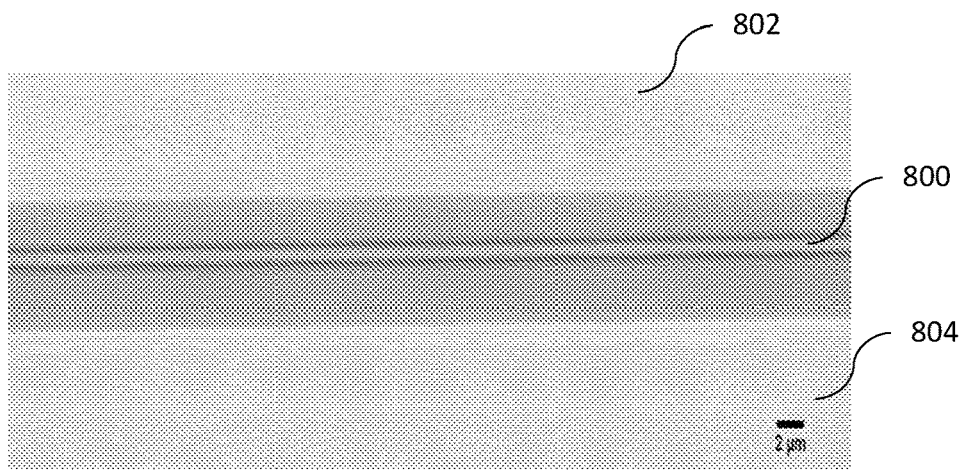
FIG. 8 shows an optical microscope image of a 0.7 μm wide barium titanate straight ridge waveguide fabricated by ICP-RIE etching, according to an example embodiment.
Figure 9:
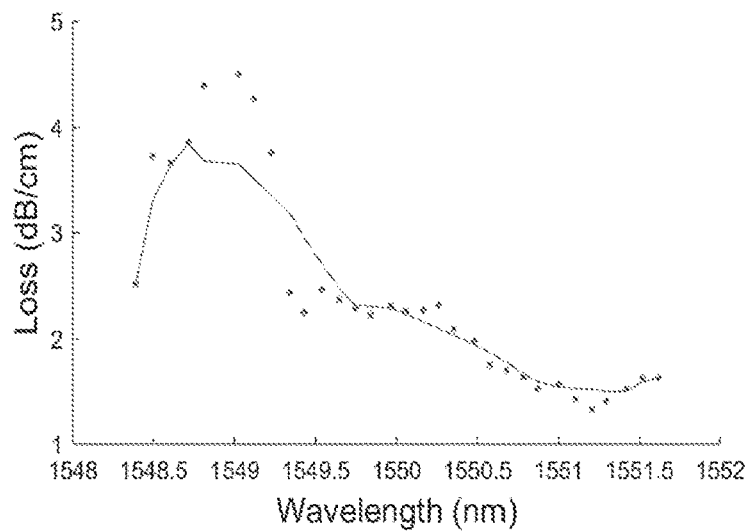
FIG. 9 shows loss measurement on a 0.6 μm wide barium titanate straight ridge waveguide according to an example embodiment near 1550 nm by Fabry-Perot method.

FIG. 8 shows an optical microscope image of an etched BTO ridge waveguide 800 fabricated by ICP-RIE etching with side electrodes 802, 804. The waveguide 800 shows a smooth surface and further characterization also revealed only minor side wall roughness, with no particulates on the waveguide 800. The waveguide 800 has a ridge width of 0.7 µm and height of 170 nm, etched from a 800 nm BTO thin film on DSO]. Results of loss measurement on a 0.6 µm width ridge waveguide with ridge height of 140 nm according to an example embodiment are shown in FIG. 9. Loss was calculated from the maxima and minima of the Fabry-Perot resonance peaks, and a low loss of 2 dB/cm was observed at 1550 nm. An average loss of 2.4205 dB/cm was observed averaging over measured wavelength range.

Figure 10:
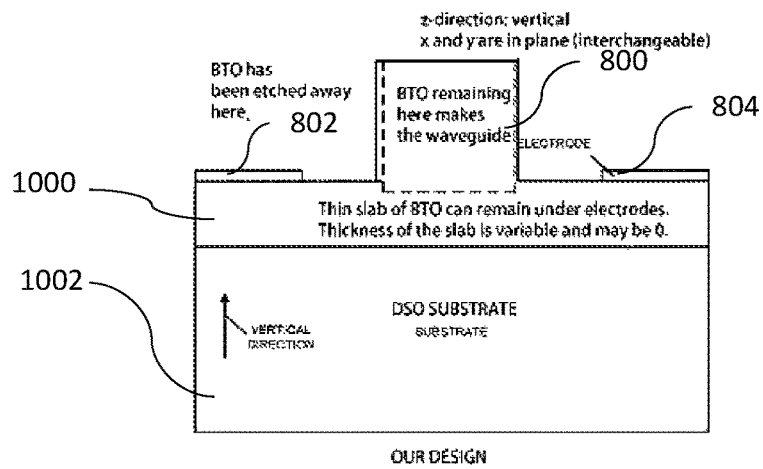
FIG. 10 shows a schematic cross-sectional view of a rib waveguide modulator design according to an example embodiment.

FIG. 10 shows a schematic cross-section view illustrating the BTO ridge waveguide 800 fabricated by ICP-RIE etching with side electrodes 802, 804. In this embodiment, a thin slab 1000 of BTO can optionally remain under the electrodes 802, 804 and ridge waveguide 800 on the growth substrate 1002, here DSO.

Substrates for Use According to Other Example Embodiments

Figures 11A, 11B:
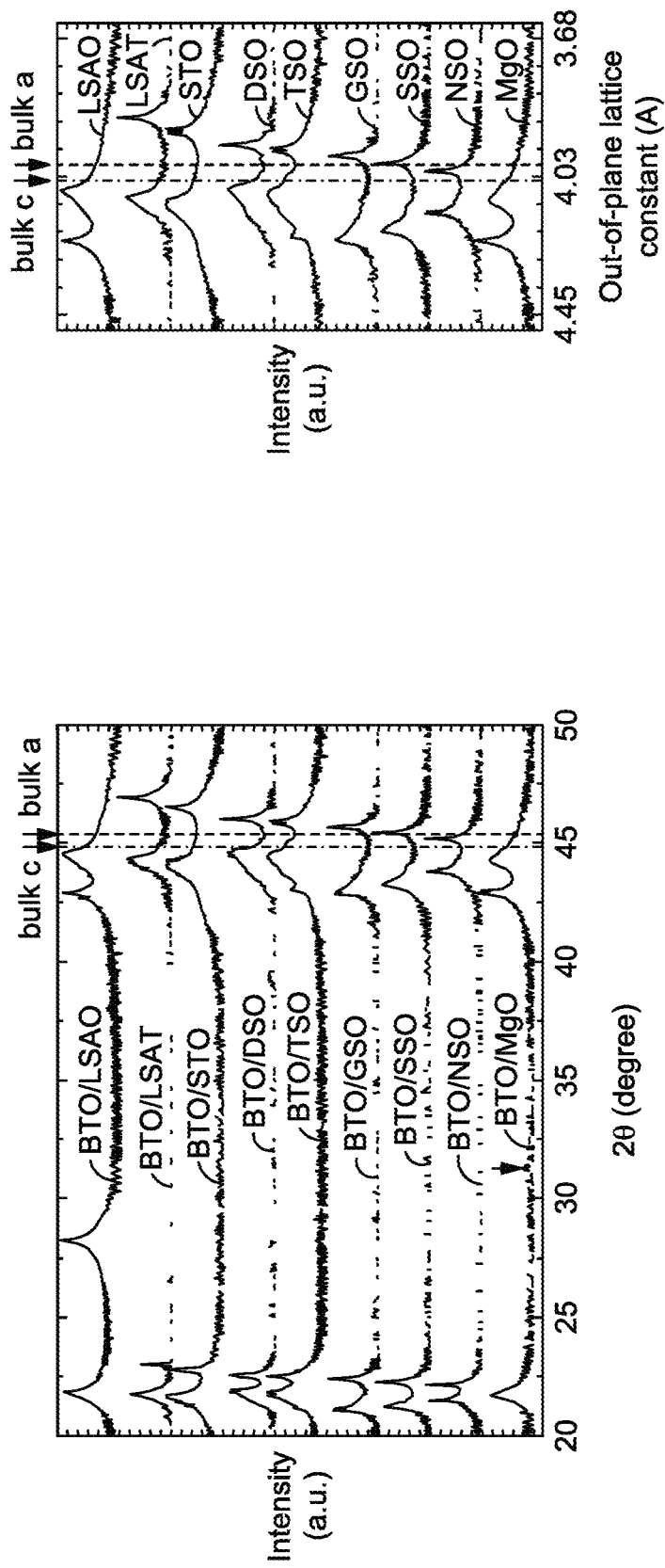
FIG. 11(a) XRD 2θ-w coupled scan for BTO film grown on different substrates, according to example embodiments.
FIG. 11(b) shows out-of-plane lattice constant converted from FIG. 11(a) near the BTO (002) peak showing a clearer single c-axis orientation and different strain states.
Figure 11C:
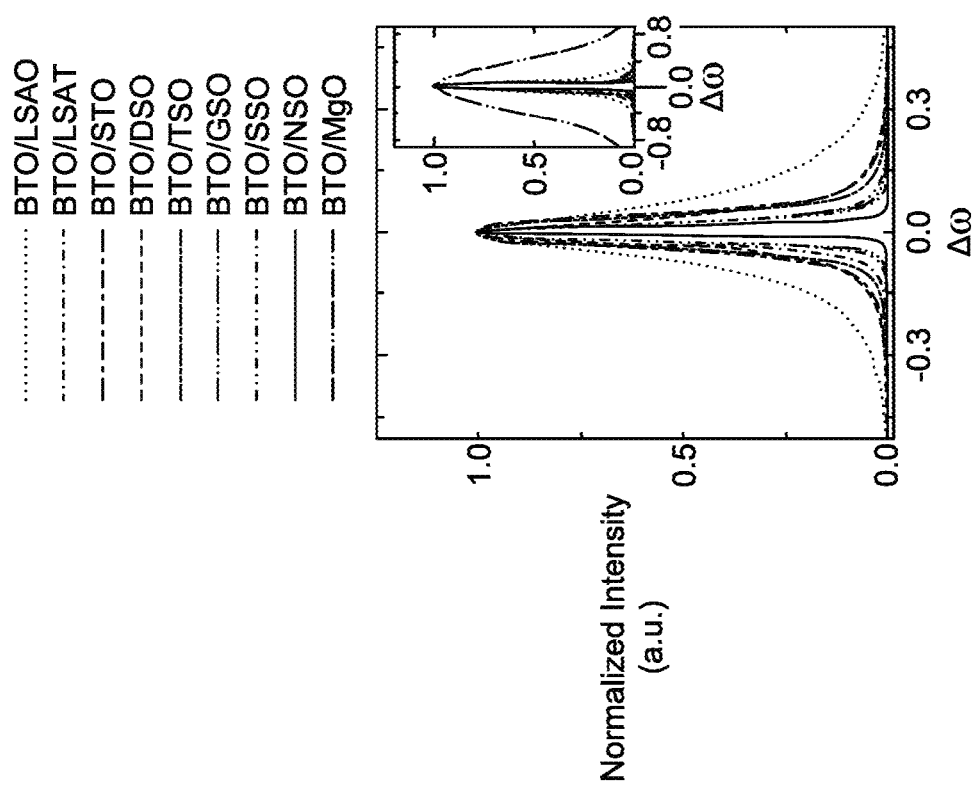
FIG. 11(c) shows a comparison of alignment of crystal orientation along the z-axis in the rocking curve at BTO (002) Bragg peak showing superior crystallinity of BTO films on proposed substrates according to example embodiments than that on MgO.
Figures 11D, 11E:
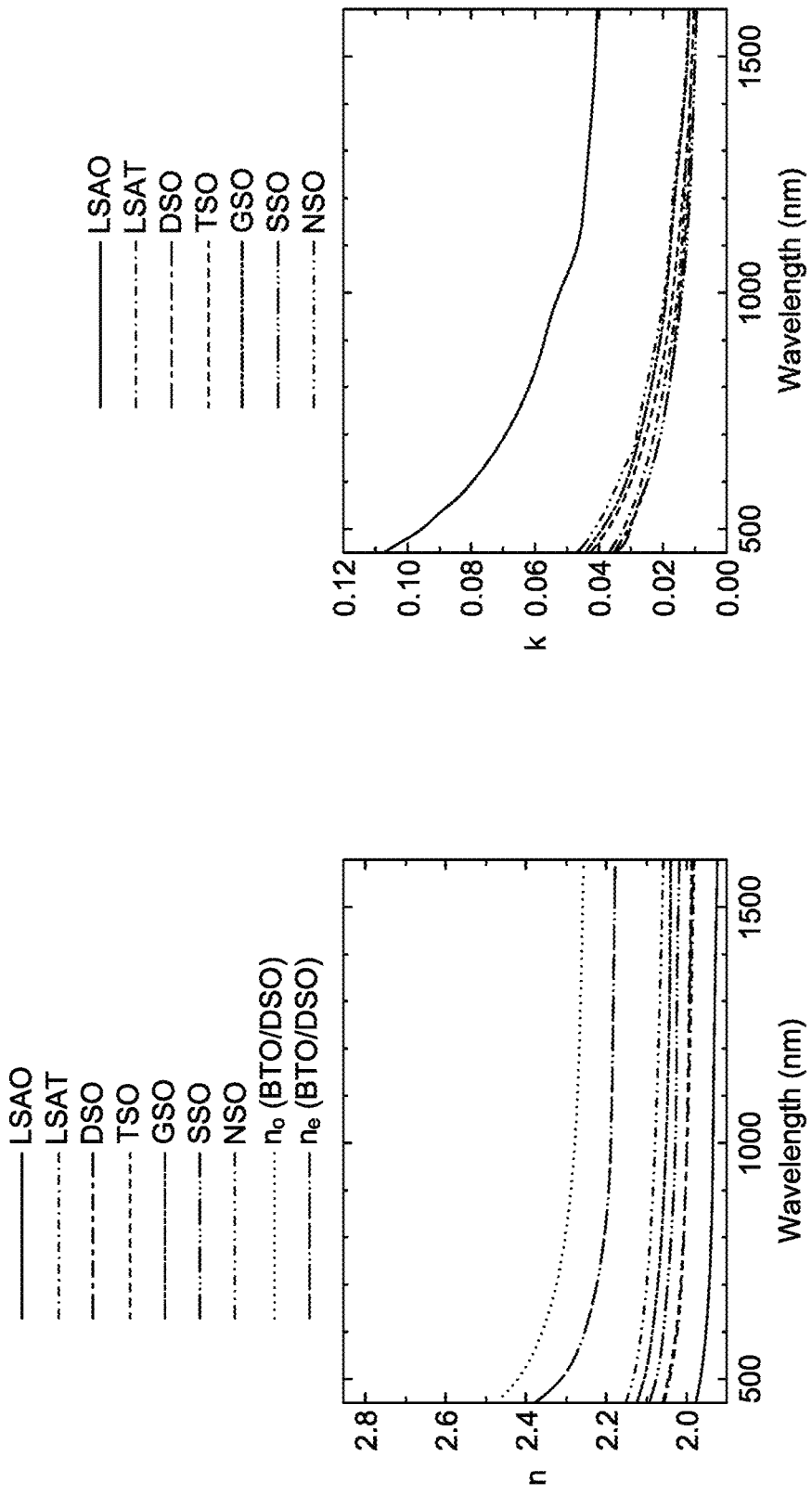
FIG. 11(d) shows the real part of refractive indices of the proposed substrates according to example embodiments measured by ellipsometry. Refractive indices of BTO film on DSO is plotted as a reference showing these substrates have lower indices than BTO film.
FIG. 11(e) shows the imaginary part of refractive indices of the proposed substrates according to example embodiments measured by ellipsometry.

As described above, a strong electro-optic effect in the BTO-on-DSO platform according to an example embodiments was shown and it was verified that the key requirements for an appropriate substrate are small lattice mismatch and low refractive index. The scandates family, with elements neighboring dysprosium, would have similar lattice parameters and refractive indices. Therefore, growth of BTO films on several scandate substrates available was explored according to different example embodiments, and high-quality single crystal BTO films were able to be grown. Additionally, although the lattice mismatch in $La_{0.3}Sr_{0.7}Al_{0.65}Ta_{0.35}O_3$ (LSAT) and $LaSrAlO_4$ (LSAO) would cause strain much larger compared with other substrates tested, these also turned out to be suitable for growth. FIGS. 11(a) and (b) show coupled scan XRD spectra for (~500 nm-thick) BTO films grown on various substrates in comparison with BTO-on-STO and BTO-on-MgO. The spectra clearly indicate that the films are all c-oriented, and the crystal quality is high as indicated in FIG. 11(c) by the small FWHM of the rocking curve at the BTO (002) Bragg peak. FIGS. 11(d) and (e) shows the real and imaginary part of refractive indices, respectively, of the proposed substrates measured by ellipsometry. Refractive indices of BTO film on DSO is plotted as a reference showing these substrates have lower indices than BTO film.

Figure 12:
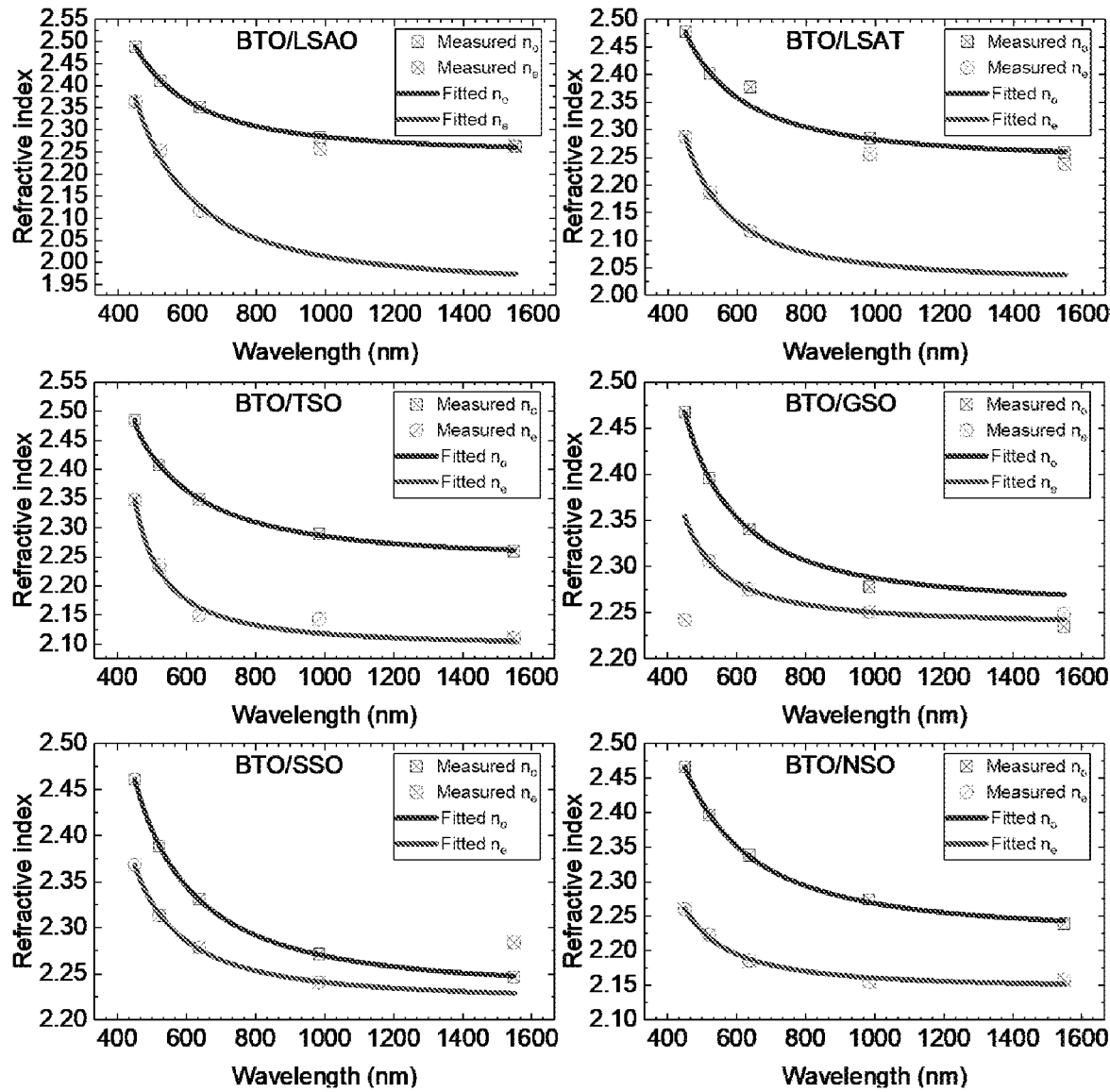
FIG. 12 shows refractive indices of BTO thin film on various substrates according to example embodiments characterized by prism coupling (slab modes).

Refractive indices of BTO thin film on various substrates according to example embodiments were characterized by prism coupling (slab modes), as shown in FIG. 12. Notably, the various substrates according to example embodiments all show lower refractive indices than the BTO thin films, compare FIG. 11(d).

Figure 13:
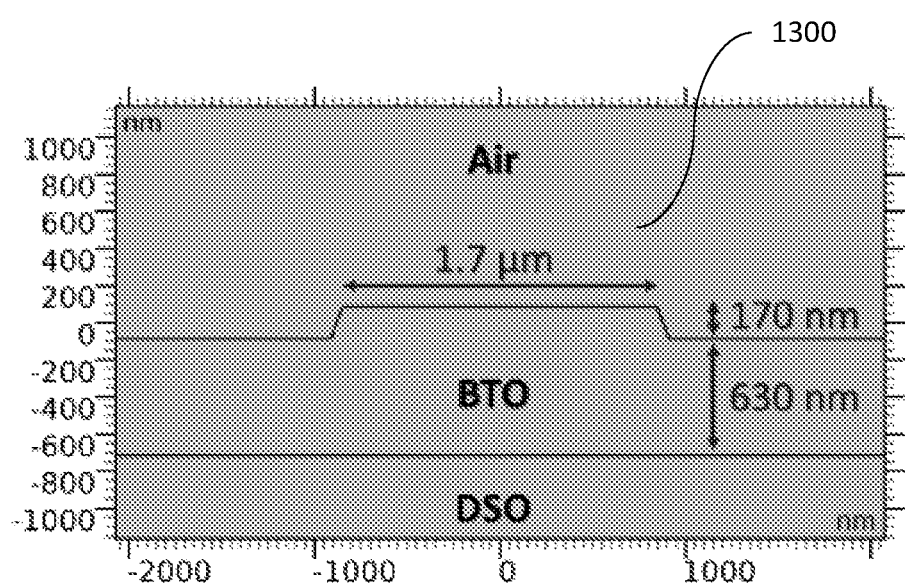
FIG. 13 shows a schematic cross-sectional view of a ridge waveguide structure according to an example embodiment.
Figure 14:
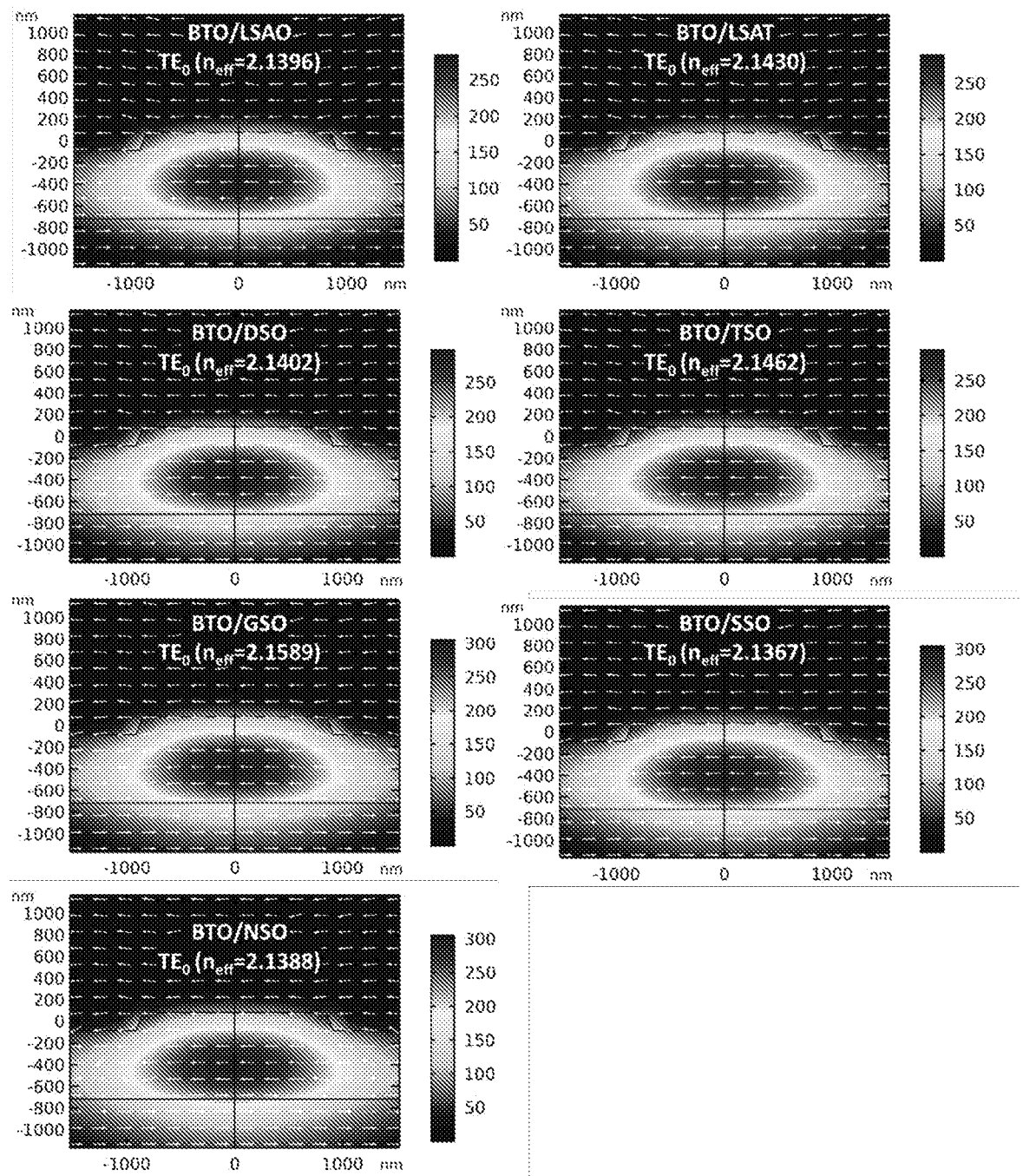
FIG. 14 shows simulated TE modes with the ridge waveguide structure as shown in FIG. 13 for various substrates tested according to example embodiments, showing good confinement.
Figure 15:
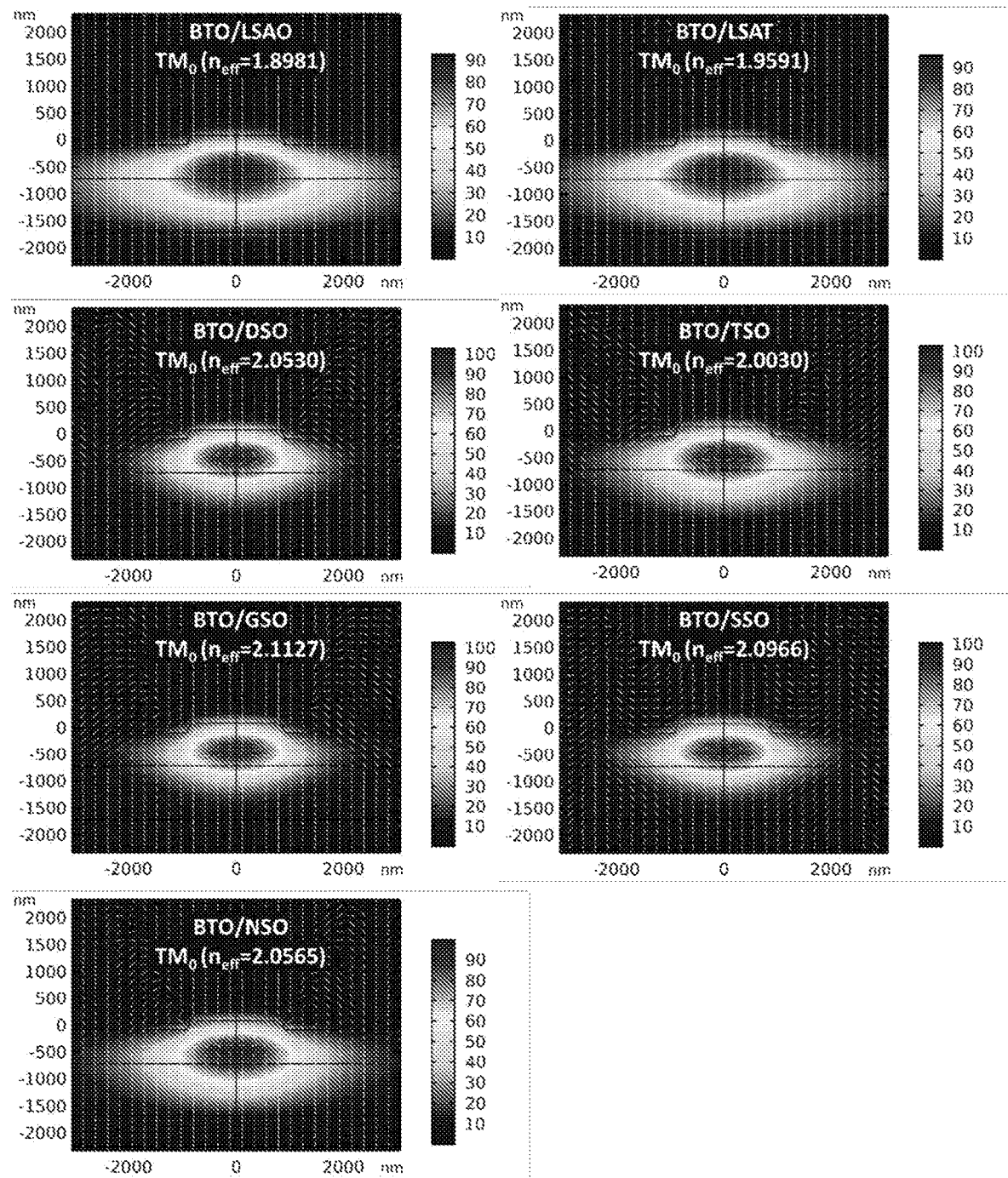
FIG. 15 shows simulated TM modes with the ridge waveguide structure as shown in FIG. 13 for various substrates tested according to example embodiments, showing good confinement.

Simulating the modes with a ridge waveguide structure 1300 as shown in FIG. 13 for various substrates tested according to example embodiments, both TE (FIG. 14) and TM (FIG. 15) modes show good confinement.

The combination of low drive voltage, compact device, and large electro-optic coefficient can yield improved modulation speeds. LiNbO$_3$ devices are typically on the order of 2-5 cm, whereas devices according to example embodiments are on the order of ~100 μm long.

Also, the optimized growth according to an example embodiment allows for good crystallinity and the optimized fabrication procedure according to example embodiment allows for low propagation loss.

In one embodiment, a structure for an optoelectronics platform according to an example embodiment comprises a substrate, and a BaTiO$_3$, BTO, film deposited on a surface of the substrate and having a thickness suitable for single mode operation with one or more possible polarization configurations with optical confinement in the BTO film at a wavelength or wavelength range of operation; wherein the substrate provides vertical refractive index confinement in a direction perpendicular to the surface of the substrate for the single mode operation optical confinement in the BTO film at the wavelength or wavelength range of operation.

The BTO may be in a relaxed state in which the strain is partially or fully relaxed from a fully strained BTO crystal.

The substrate comprises one of a group consisting of La$_{0.3}$Sr$_{0.7}$Al$_{0.65}$Ta$_{0.35}$O$_3$ (LSAT), LaSrAlO$_4$ (LSAO), DyScO$_3$ (DSO) and the scandate family with similar such properties, such as/including GdScO$_3$, SmScO$_3$, TbScO$_3$, NdScO$_3$, HoScO$_3$, ErScO$_3$, TmScO$_3$, YbScO$_3$, LuScO$_3$, PrScO$_3$, LaScO$_3$, YScO$_3$ The BTO film may be formed into a BTO waveguide on the surface of the substrate.

The BTO waveguide may be in the form of a BTO rib waveguide on the surface of the substrate.

The structure may be incorporated into a Mach-Zehnder modulator configuration. The structure may further comprise an electrode formed on the surface of the substrate on each side of the BTO waveguide.

The structure may further comprise a polarization filter at an output end of the BTO waveguide. The BTO waveguide may be configured such that an electric field can be applied along an axis perpendicular to the c-axis of the BTO waveguide for controlling polarization of light propagating in the BTO waveguide with a polarization in plane oriented in plane to be the same as the axis perpendicular to the c-axis. The structure may be incorporated a polarization-based light modulator.

Figure 16:
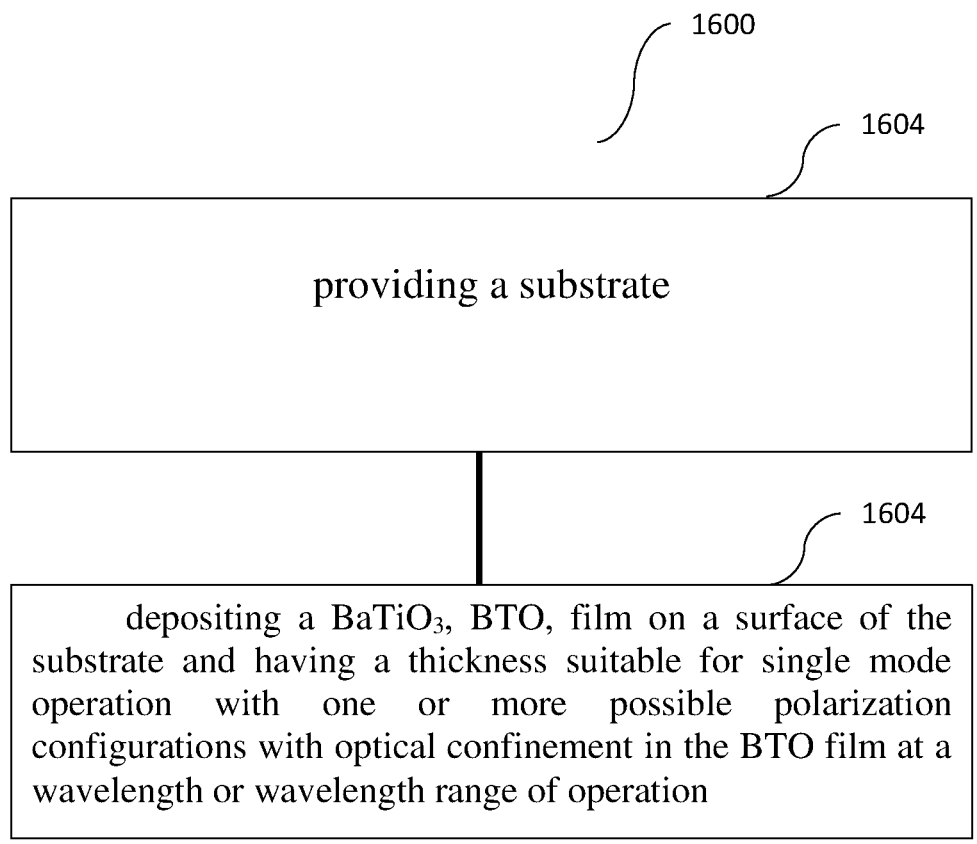
FIG. 16 shows a flowchart 1600 illustrating a method of fabricating a structure for an optoelectronics platform, according to an example embodiment.

FIG. 16 shows a flowchart 1600 illustrating a method of fabricating a structure for an optoelectronics platform, according to an example embodiment. At step 1602, substrate is provided. At step 1604, a BaTiO$_3$, BTO, film is deposited on a surface of the substrate and having a thickness suitable for single mode operation with one or more possible polarization configurations with optical confinement in the BTO film at a wavelength or wavelength range of operation; wherein the substrate is chosen to provide vertical refractive index confinement in a direction perpendicular to the surface of the substrate for the single mode operation optical confinement in the BTO film at the wavelength or wavelength range of operation.

The BTO may deposited to be in a relaxed state in which the strain is partially or fully relaxed from a fully strained BTO crystal.

The substrate may comprises one of a group consisting of La$_{0.3}$Sr$_{0.7}$Al$_{0.65}$Ta$_{0.35}$O$_3$ (LSAT), LaSrAlO$_4$ (LSAO), DyScO$_3$ (DSO) and the scandate family with similar such properties, such as/including GdScO$_3$, SmScO$_3$, TbScO$_3$, NdScO$_3$, HoScO$_3$, ErScO$_3$, TmScO$_3$, YbScO$_3$, LuScO$_3$, PrScO$_3$, LaScO$_3$, YScO$_3$.

The BTO film may be formed into a BTO waveguide on the surface of the substrate.

The BTO waveguide may be formed as a BTO rib waveguide on the surface of the substrate.

The method may comprise incorporating the structure into a Mach-Zehnder modulator configuration. The method may further comprise forming an electrode on the surface of the substrate on each side of the BTO waveguide.

The method may further comprise providing a polarization filter at an output end of the BTO waveguide. The method may further comprise configuring the BTO waveguide such that an electric field can be applied along an axis perpendicular to the c-axis of the BTO waveguide for controlling polarization of light propagating in the BTO waveguide with a polarization in plane oriented in plane to be the same as the axis perpendicular to the c-axis. The method may comprise incorporating the structure into a polarization-based light modulator.

The method may further comprise the steps of:
depositing a first mask layer on the BTO film;
depositing a resist layer on the first mask layer;
patterning the resist layer;
developing the resist layer to form a second mask layer;
removing portions of the first mask layer not covered by the second mask layer so as to provide a double-layer mask for processing of the BTO film.

The first mask layer may comprise a metal, such as chromium. The metal layer may be deposited via electron beam evaporator. The resist layer may be patterned via electron beam lithography. The portions of the first mask layer may be removed by wet etching. The method may further comprise the processing of the BTO film. The further processing may comprise ion milling, RIE etching or ICP etching.

Embodiments of the present invention can have one or more of the following features and associated benefits/advantages:

| Feature | Benefit/Advantage |
|---|---|
| DyScO3 (DSO) is used as substrate for BTO growth where the BTO will form an optical waveguide with vertical index confinement created by the lower refractive index DSO substrate. Also, the small lattice mismatch enables high quality single crystal BTO growth, which leads to large effective r$_{42}$ (or r$_{51}$). La$_{0.3}$Sr$_{0.7}$Al$_{0.65}$Ta$_{0.35}$O$_3$ (LSAT), LaSrAlO$_4$ (LSAO), and the scandate family with similar such properties, such as/including GdScO$_3$, SmScO$_3$, TbScO$_3$, | The refractive index of DSO is lower than that of BTO, allowing creation of vertical index confinement which is useful for the design of planar optical functionality. A small lattice mismatch between BTO and DSO enables high quality BTO growth, which enable realization of large r$_{42}$ (or r$_{51}$) value. The r$_{42}$ (and nominally equivalent r$_{51}$) electro-optic parameters are the largest parameters in the r-matrix and thus are the targeted parameters. |

| Feature | Benefit/Advantage |
|---|---|
| NdScO$_3$, HoScO$_3$, ErScO$_3$, TmScO$_3$, YbScO$_3$, LuScO$_3$, PrScO$_3$, LaScO$_3$, YScO$_3$, could also be good alternatives to DSO. | |
| The BTO is of the correct thickness to permit single mode optical confinement at the wavelength or wavelengths of operation. | The BTO and DSO substrate are transparent, and of a slab thickness on the order of a half wavelength, so that at commonly used telecom/datacom wavelengths, light guided within the BTO can be single mode. |
| A waveguide in etched BTO is oriented such that an electric field can be applied in either of the crystal directions such that light propagating within the BTO will be affected by the r$_{42}$ (or r$_{51}$) parameter. For example, a rib waveguide could have electrodes on either side such that an electric field can be applied perpendicular to the direction of light propagation and also perpendicular (or parallel to) the polarization of the propagating light. | In a hypothetical alternative scenario where the BTO c-axis (or z-axis) would be in-plane, electrodes would need to be placed perpendicular to the BTO c-axis (or z-axis) so that the applied voltage creates an electric field along the y or x axes to make use of the r$_{42}$ (or r$_{51}$) parameter; this would be very challenging because it would necessitate creating a buried electrode beneath the substrate. According to a preferred embodiment, however, with the c-axis (or z-axis) of BTO in the out-of-plane direction, electrodes can be placed laterally to make the best use of the r$_{42}$ (or r$_{51}$) parameter. |
| Without any applied electric field, linearly polarized light will remain linearly polarized, but with an applied electric field, the polarization will rotate to elliptical polarization continuously along the length of waveguide bounded by electrodes according to an example embodiment. External or integrated linear polarizers can be placed at the two ends of the modulator, cross polarized, to complete a simple modulator design. An alternative design consists of a traditional Mach-Zehnder interferometer-type modulator according to another example embodiment, where the polarization rotation is in addition to the phase slip of a traditional design. | The main limitation of the speed of modulation in any long modulator is creating a match between the electrical mode propagating along the electrodes, and the optical modes propagating in the adjacent waveguide. Ideally, these modes should propagate at the same speed. In both configurations according to example embodiments (polarization modulation as well as Mach-Zehnder-based phase modulation), electrode length has been calculated to be much shorter than that in other modulators such as those used in traditional lithium niobate external modulators. This will yield lower driving voltages, reduced modulator lengths, improved modulation speed, or a combination of all three properties. Although the Mach-Zehnder modulator configuration in BTO will still work in a superior way to the Mach-Zehnder configuration in a traditional lithium niobate waveguide, the polarization modulator configuration according to a preferred embodiment can achieve rotation of polarization by 90 degrees within a much shorter propagation length than that of π phase shift in a Mach-Zehnder modulator |

Embodiments of the present invention can provide for:

The use of DSO as the substrate for BTO growth, with small lattice mismatch and a refractive index much lower than that of BTO.

The design of a high bandwidth modulator,

The fabrication that allows the low-loss etching of BTO,

A large electro-optic coefficient and a high 3-dB band width being achieved.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

We claim:

1. A structure for an optoelectronics platform comprising:
a substrate, and
a BaTiO$_3$ (BTO) film deposited on a surface of the substrate and having a thickness such that the BTO film is configured for single mode operation with one or more polarization configurations with optical confinement in the BTO film at a wavelength range of operation from about 400 nm to 1600 nm;
wherein the substrate provides vertical refractive index confinement in a direction perpendicular to the surface of the substrate for the single mode operation optical confinement in the BTO film at the wavelength range of operation; and
wherein the substrate comprises one of a group consisting of La$_{0.3}$Sr$_{0.7}$Al$_{0.65}$Ta$_{0.35}$O$_3$ (LSAT), LaSrAlO$_4$ (LSAO), GdScO$_3$, SmScO$_3$, TbScO$_3$, NdScO$_3$, HoScO$_3$, ErScO$_3$, TmScO$_3$, YbScO$_3$, LuScO$_3$, PrScO$_3$, LaScO$_3$, YScO$_3$.

2. The structure of claim 1, wherein the BTO film is in a relaxed state in which the strain is partially or fully relaxed from a fully strained state.

3. The structure of claim 1, the BTO film is formed into a BTO waveguide on the surface of the substrate.

4. The structure of claim 3, wherein the BTO waveguide is in the form of a BTO rib waveguide on the surface of the substrate.

5. The structure of claim 4, incorporated into a Mach-Zehnder modulator configuration.

6. The structure of claim 4, further comprising an electrode formed on the surface of the substrate on each side of the BTO waveguide.

7. The structure of claim 4, further comprising a polarization filter at an output end of the BTO waveguide, and wherein the BTO waveguide is configured such that an electric field is appliable along an axis perpendicular to the c-axis of the BTO waveguide for controlling polarization of light propagating in the BTO waveguide, such that without an applied electric field, linearly polarized light at an input end of the BTO waveguide substantially remains linearly polarized during propagation, whereas with the applied electric field, the polarization rotates to elliptical polarization along the length of the BTO waveguide, wherein the polarization filter at the output end is cross polarized compared to the linearly polarized light at the input end for providing a polarization-based light modulator.

8. A method of fabricating a structure for an optoelectronics platform according to claim 1 comprising the steps of:
providing the substrate, and
depositing the BaTiO$_3$ (BTO) film on a surface of the substrate and having a thickness such that the BTO film is configured for single mode operation with one or more polarization configurations with optical confinement in the BTO film at the wavelength range of operation.

9. The method of claim 8, wherein the BTO film is deposited to be in a relaxed state in which the strain is partially or fully relaxed from a fully strained state.

10. The method of claim 8, wherein the BTO film is formed into a BTO waveguide on the surface of the substrate.

11. The method of claim 10, wherein the BTO waveguide is formed as a BTO rib waveguide on the surface of the substrate.

12. The method of claim 11, comprising incorporating the structure into a Mach-Zehnder modulator configuration.

13. The method of claim 11 further comprising forming an electrode on the surface of the substrate on each side of the BTO waveguide.

14. The method of claim 11, further comprising providing a polarization filter at an output end of the BTO waveguide, and further comprising configuring the BTO waveguide such that an electric field is appliable along an axis perpendicular to the c-axis of the BTO waveguide for controlling polarization of light propagating in the BTO waveguide with a polarization in plane oriented in plane to be the same as the axis perpendicular to the c-axis.

15. The method of claim 8, further comprising the steps of:
depositing a first mask layer on the BTO film;
depositing a resist layer on the first mask layer;
patterning the resist layer;
developing the resist layer to form a second mask layer;
removing portions of the first mask layer not covered by the second mask layer so as to provide a double-layer mask for processing of the BTO film.

16. The method of claim 15, wherein the first mask layer comprises a metal, such as chromium.

17. The method of claim 15, wherein the metal layer is deposited via electron beam evaporator.

18. The method of claim 15, wherein the resist layer is patterned via electron beam lithography.

19. The method of claim 15, wherein the portions of the first mask layer are removed by wet etching.

20. The method of claim 15, further comprising the processing of the BTO film, wherein the further processing comprises ion milling, RIE etching or ICP etching.

* * * * *